(12) United States Patent
Knibbe et al.

(10) Patent No.: US 9,237,634 B2
(45) Date of Patent: Jan. 12, 2016

(54) LIGHT GUIDING SYSTEM AND A METHOD FOR CONTROLLING THE SAME

(75) Inventors: Engel Johannes Knibbe, Heeze (NL); Alexander Ertz, Memphis, TN (US); Mareike Klee, Straelen (DE); Leo Verhees, Veldhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 963 days.

(21) Appl. No.: 13/388,354

(22) PCT Filed: Jul. 29, 2010

(86) PCT No.: PCT/IB2010/053455
§ 371 (c)(1),
(2), (4) Date: Mar. 29, 2012

(87) PCT Pub. No.: WO2011/015975
PCT Pub. Date: Feb. 10, 2011

(65) Prior Publication Data
US 2012/0181934 A1    Jul. 19, 2012

(30) Foreign Application Priority Data
Aug. 5, 2009    (EP) ..................................... 09167261

(51) Int. Cl.
| | |
|---|---|
| *H05B 39/10* | (2006.01) |
| *H05B 37/03* | (2006.01) |
| *H05B 37/02* | (2006.01) |
| *G08B 7/06* | (2006.01) |
| *H02J 9/02* | (2006.01) |

(52) U.S. Cl.
CPC ............ *H05B 37/0245* (2013.01); *G08B 7/066* (2013.01); *H05B 37/0227* (2013.01); *H02J 9/02* (2013.01)

(58) Field of Classification Search
USPC .................................................. 327/129–136
See application file for complete search history.

(56) References Cited

U.S. PATENT DOCUMENTS

| | | | |
|---|---|---|---|
| 4,227,191 A | 10/1980 | Raber | |
| 4,963,798 A * | 10/1990 | McDermott | 315/312 |
| 5,357,170 A * | 10/1994 | Luchaco et al. | 315/159 |
| 6,225,760 B1 * | 5/2001 | Moan | 315/360 |
| 7,021,787 B1 | 4/2006 | Kuelbs | |
| 7,026,768 B1 | 4/2006 | Ruiz | |
| 7,355,349 B2 | 4/2008 | Evans | |
| 8,203,445 B2 * | 6/2012 | Recker et al. | 340/531 |
| 8,994,276 B2 * | 3/2015 | Recker et al. | 315/160 |

(Continued)

FOREIGN PATENT DOCUMENTS

| | | |
|---|---|---|
| DE | 20315806 U1 | 5/2004 |
| DE | 102008028909 A1 | 12/2009 |

(Continued)

*Primary Examiner* — Brandon S Cole
(74) *Attorney, Agent, or Firm* — Meenakshy Chakravorty (57) ABSTRACT

According to the present invention, a light guidance system for adapted illumination in emergency or power cut situations is provided, wherein the light guidance system is connected to an auxiliary power supply system (101) and comprises at least one light unit (103) adapted to emit light for illuminating surroundings and a control unit adapted to increase a light level of the light unit (103) according to a presence signal indicating the presence of a person, wherein the increasing of the light level is adjusted to enable a mandatory lighting period and a mandatory light level by considering a power value of the auxiliary power supply system (101).

17 Claims, 4 Drawing Sheets

(56) References Cited

U.S. PATENT DOCUMENTS

| | | | |
|---|---|---|---|
| 2007/0061050 A1* | 3/2007 | Hoffknecht | 700/291 |
| 2007/0229250 A1* | 10/2007 | Recker et al. | 340/531 |
| 2010/0141153 A1* | 6/2010 | Recker et al. | 315/149 |
| 2010/0201267 A1* | 8/2010 | Bourquin et al. | 315/32 |
| 2010/0271802 A1* | 10/2010 | Recker et al. | 362/20 |
| 2013/0342131 A1* | 12/2013 | Recker et al. | 315/292 |

FOREIGN PATENT DOCUMENTS

| | | |
|---|---|---|
| EP | 1942475 A2 | 7/2008 |
| JP | 5159885 A | 6/1993 |
| JP | 10172770 A | 6/1998 |
| JP | 10275684 A | 10/1998 |
| JP | 11213712 A | 8/1999 |
| JP | 2007073193 A | 3/2007 |
| JP | 2007189794 A | 7/2007 |
| JP | 2008158830 A | 7/2008 |
| WO | 9947991 A1 | 9/1999 |
| WO | 2005041146 A1 | 5/2005 |
| WO | 2005116519 A1 | 12/2005 |
| WO | 2006086812 A2 | 8/2006 |

* cited by examiner

LIGHT GUIDING SYSTEM AND A METHOD FOR CONTROLLING THE SAME

FIELD OF INVENTION

The invention relates to a light guiding system and a method for controlling the same.

BACKGROUND OF THE INVENTION

Conventional light guidance systems in an underground car park or public subways employ movement detectors in order to reduce power consumption by switching on light sources only, when a person passes by. In a situation of restricted power supply, however, switching on all light sources of the whole system will soon result in a supply shortfall. Therefore, in many of these systems, the intensity level of emitted light is lower than in a standard illumination for saving energy, although a higher light level would ameliorate the ability of orientation and the feeling of ease and comfort. Normally, these light guidance systems are powered by an external power supply system and the light sources are emitting at a low mandatory intensity level. For power cut situations, the light guidance systems and in particular emergency lighting systems are often provided with a backup power system so that the illumination can be kept up.

U.S. Pat. No. 7,355,349 B2 describes an emergency lighting system adjusting the emergency lighting level according to a detected luminance of surroundings and a detected motion of a person. However, if battery level is low and power is cut, a high-intensity illumination will lead to a decreased time period of illumination, possibly contradicting the norm standards.

SUMMARY OF THE INVENTION

It is therefore an object of the present invention to provide an economic and reliable light guidance system, wherein an illumination of a person's surroundings is adapted to the requirements of the situation, thus improving orientation.

In particular, it is an object of the invention to provide a light guidance system, wherein the intensity level of illumination and the duration of illumination are adapted at least to the presence of a person and to the availability of power.

The objects are solved by the features of the independent claims.

A light guidance system is provided, which is connected to an auxiliary power supply system and comprises at least one light unit adapted to emit light for illuminating surroundings and a control unit adapted to increase a light level of the light unit according to a presence signal indicating the presence of a person, wherein the increasing of the light level is adjusted to enable a mandatory lighting period and a mandatory light level by considering a power value of the auxiliary power supply system. The light unit may be connected to a local auxiliary power supply system or to a central auxiliary power supply. Moreover, the at least one light unit may be controlled by a local control unit. However, in case of more than one light unit, the control unit is preferably common to few or all light units. By controlling the intensity level of light emitted by a light unit according to whether a person is present close to the respective light unit and according to whether sufficient power is available for this light unit, the system becomes both reliable and economic. This enables to provide high intensity light in a situation, where a person needs light, although it is ensured by monitoring the remaining energy of the auxiliary power supply system that a mandatory lower light level can still be provided for the remaining mandatory period of time. The presence signal indicates, whether a person is present and/or which is the closest light unit, and may be transmitted to the control unit using a wired or wireless network. A person may be detected by a presence sensor that is comprised in other already existing systems, e.g. burglar alarm systems, or by a separate presence sensor coupled to the light unit or by a presence sensor integrated in the light unit.

In one embodiment, the auxiliary power supply system is realized with a battery or as a self-contained power supply. For instance, a central emergency power generator, locally provided batteries or a combination of both may be used. By these means, the light guidance system according to one embodiment of the present invention is independent of the external or public power supply.

For considering the power value, the control unit is preferably adapted to determine a charge status of the battery or a voltage status of the self-contained power supply, i.e. the voltage or the power capacity. This means that the charge or power status of the auxiliary power supply system may be represented by or included in the power value. Considering the power value will enable the system to adapt the performance of the system to the power available from the auxiliary power supply system. To monitor the power value is helpful, since auxiliary power supply systems are often restricted in their ability to provide power due to the charge status or due to an amount of loads connected to a generator.

In another example, in case of a high-charged auxiliary power supply system and a presence signal, the light level is increased for a predetermined time period. Thus, the surroundings are well illuminated for a person passing by, if there is enough power available. The predetermined time period may be an estimation of an average time interval for traversing the illuminated area and approaching the next light unit. It may also be required to maintain the high-level illumination longer in order to make a passing person feeling comfortable and safe.

In a further example, in case of a high-charged auxiliary power supply system and no presence signal, the light level is adjusted to a level enabling to provide the mandatory light level for the remaining mandatory period. This will preferably be a low intensity level in order to save energy. Since no person is present, the low level will not impair the performance or utility of the system. However, in agreement with emergency norms, a minimum light level may be required regardless of a person being present. However, in particular in case of an alarm, it may be required to adjust the light level to a high light level despite of no person being detected, if the external power supply system is working.

Preferably, in case of a low-charged auxiliary power supply system, the light level is adjusted to a level enabling to provide the mandatory light level for the remaining mandatory period. Thus, the control unit may reduce the light level to the mandatory light level in case that the power of the auxiliary power supply system is just sufficient to provide the lower mandatory light level for the remaining mandatory period. Hence, if the control unit has increased the light level for a certain time and determines then, that the remaining power is just sufficient for providing the lower mandatory light level for the remaining mandatory period, the control unit reduces the light level to this mandatory level regardless of a person being present. By this, it is ensured that the predetermined mandatory light level and light duration can always be provided, as it may be required by legal norms.

In another example, the control unit is adapted to adjust the light level of the light unit and to adjust a lighting period in dependency of the power value of the auxiliary power supply system. Therefore, not only the intensity level of illumination is adapted to the available power, but also the time interval, for which a higher intensity level is maintained, in order to meet ensuring regulations. For instance, the light level as well as the period for maintaining this light level may be continuously adjustable. Thereby, the performance required by the presence of a person is balanced versus the given condition of the power value and the needs can be encountered in an optimized fashion. To further save energy, the light unit may be controlled to switch repeatedly between a high intensity level and a low intensity level with a relatively high predetermined frequency, provided that the norms allow such switching. This blinking mode will reduce the consumed power and thus lengthen a possible illumination period.

In a preferred embodiment, the control unit is adapted to control the light of the light unit in case of a power cut of the main power supply system. Under normal conditions, the power is provided by an external power system in this example and the auxiliary power supply system may be loaded. In case of a power cut, the auxiliary power supply system may then be fully charged and the light guidance system with all its components may remain functional.

In a further example, the light guidance system comprises at least two light units connected to the control unit, wherein the control unit is adapted to determine a priority of the light units according to at least one presence signal indicating the presence of a person next to at least one of the light units and to adjust a light level of the light units according to their priority. This may be in particular of use, if the power value of the auxiliary power supply system is already low. Therefore, the control unit can decide how to distribute the remaining energy of the auxiliary power supply system among the light units based on the presence signals received. A presence signal is existent at the control unit, if a person is detected in the neighborhood of a light unit, and indicates at which light unit the presence has been detected. If a person is detected only at one light unit, this light unit may be controlled by the control unit to increase its light intensity, while the other, where no one is detected, is controlled to emit at a low level or even to be switched off. However, in case of persons being present at both light units, both light units may emit at high level for a shorter period depending on the power value. In all cases, the illumination is always controlled with consideration of the charge or power status of the auxiliary power supply system so that afterwards the remaining power will still allow to provide the preset minimum light level for the remaining preset minimum time period.

Preferably, a light guidance system according to an embodiment of the present invention also comprises at least one presence sensor or a presence sensor array adapted to detect the presence of a person and, in case of presence detection, to provide the presence signal to the control unit. By only transmitting a presence signal to the control unit in case of a person being detected, unnecessary information and network flooding is avoided. This is of particular importance, if low data-rate networks are used for data transmission. The signals may be sent via a wired or wireless network or a combination of both. Preferably, each light unit may be provided with its own presence sensor, so that the assignment of the presence signal to a particular light unit may already be determined by the sending presence signal. For this, the presence signal may contain an identification code of the presence sensor or of the light unit. Alternatively, a presence sensor is assigned to several light units and the closest light unit has to be determined by estimating a distance of a person to each light unit. In this case, the presence signal may comprise only an identity of the closest light unit. Additionally, a time stamp may be determined for each presence signal. Alternatively, a presence sensor is assigned to several lighting units.

Preferably, the presence sensor is realized as an ultrasonic movement sensor and/or a radar-based movement sensor. Also arrays of ultrasound sensors or radar based sensor can be applied. These sensors are known not to be sensitive to heat and their operation to be unimpaired by smoke or darkness.

In a preferred embodiment, the light guidance system as described in one of the above mentioned embodiments is used as a rescue aiding system, wherein the control unit may further be adapted to receive an alarm signal or to determine an alarm state. For this, the light guidance system may be integrated in an alarm system or be communicating with it. Alternatively, the light guidance system may also be equipped with sensors for determining an alarm state, such as smoke or fire detectors.

In another embodiment, the light guidance system comprises further a presence indicator adapted to indicate the presence of a person locally and/or centrally. A local presence indicator may be realized, for instance, as a lamp outside a room, which is bright or blinking, when the room is occupied. A central presence indicator may be realized as a large display screen or as small lamps on a board displaying the layout of the premises, wherein the lamps indicate for rescue services, in which room or location persons are still present.

In a further embodiment, a presence indicator may indicate the direction of movement of a person. This may based on subsequent movement detection information or on movement detection by presence sensors.

In addition, the control unit may be adapted to receive all presence signals of the light guidance system and to display the location of persons corresponding to the presence signals on a screen. The control unit is possibly located in a central and easily accessible place of the premises and can be realized as a computer. Thus, a central computer may locate and display all presence signals on a screen as a list or on a layout. If the system is used as a rescue aiding system, this facilitates the finding and saving of people for the rescue service. Alternatively, the control unit may be located outside of the premises, e.g. directly at a rescue service, in order to avoid the control unit being damaged and the presence information being lost in case of a fire or the like.

Preferably, the light guidance system comprises additionally a local alerting unit adapted to acoustically and/or optically indicate an alarm state in a place, where a person is detected. For example, a siren and/or a warning lamp may be provided in each room and acoustically and/or optically warn the person inside in case of an emergency situation.

In another embodiment, the control unit is adapted to control the light unit that is subsequent on a corridor, path or escape route to the light unit closest to a detected person, to emit light at high level, if this light unit has sufficient power available. Thereby, a fleeing person is guided along the escape route in direction of the emergency exit by switching already the next light unit to high level, which is the next to be passed on the escape route. The person can thus follow the light units of high intensity and easily find his direction. If preferred, not only the next light unit but also one or more subsequent light units may be started to emit light at high level, showing the preferred escape route. Moreover, the lighting system may be linked to a Building Management System. This allows to adapt a preferred escape route based on information of the Building Management System. In a more general light guidance system, increasing the light level of the next light unit together with the level of a first light unit, where a person is detected, may make a passerby feel at ease. Also in this case, it may be required to take the power value into account.

The object of the invention is also solved by providing a method for controlling a light guidance system which comprises a light unit and a control unit and a presence sensor and which is connected to an auxiliary power supply system, the method comprises the steps of determining whether a presence signal is received, determining a power value of the auxiliary power supply system, adjusting a level of light emitted by the light unit according to the presence signal and the power value to enable a mandatory lighting period and a mandatory light level of the light unit. Of course, the order of the steps of determining the presence signal and the power value is arbitrary.

DETAILED DESCRIPTION OF EMBODIMENTS

The light guidance system according to the present invention may be applied as a lighting system for large buildings, underground car parks, public premises or parks. The light guidance system is designed to provide adapted illumination in emergency or power cut situations. The light guidance system may be integrated or communicatingly connected to other systems, e.g. home automation systems, alarm systems or building management systems.

In an exemplary embodiment, a light guidance system comprises one or more light units and at least one control unit. The light guidance system is connected to an external or public power supply system. In case of a power cut, the light guidance system is powered by an auxiliary power supply system, e.g. batteries, emergency power generators or other self-contained power supply systems, wherein the auxiliary power supply system is charged, when external power is available.

The light unit located on a ceiling or close to a floor comprises illuminating means or light sources, e.g. LEDs, spotlights, halogen lamps or energy saving lamps or other long-lasting and persistent or economic light sources, which can emit light at least two different intensity levels. Preferably, the intensity of the emitted light can be continuously varied, as it is the case for dimming scenes. Possibly, the light unit does not emit in all directions, but the beam direction is adjusted according to the needs.

The light guidance system may also comprise presence sensors or a presence sensor array for detecting the presence of a person. The presence sensor can be part of the light unit or can be installed separately. However, the presence sensors may also be part of another already installed system, e.g. a home automation system, a home lighting control system or a burglar alarm system. Preferably, when the presence sensors are not self-sustaining or stop functioning when the power is cut, the control unit will use the last presence/absence information that was supplied to it. The presence sensors are adapted to communicate with the control unit of the light guidance system via a wired or wireless network for sending presence signals, if a person is detected. As presence sensors, all kind of sensors adapted to determine the presence of a person can be used, e.g. acoustical, ultrasound, infrared or optical presence detectors or a combination of both covering, for example, passive-IR movement detectors, or detectors using laser, sensors using ultrasound, sensors based radio frequency, microphones or a camera. If the light guidance system is required to be also functional in emergency situations, the presence sensors are preferably ultrasonic or radar-based movement detectors, since these are known not to be sensitive to heat and able to look through smoke or darkness, which are conditions relevant for emergencies. The presence signal comprises at least information that a person is present and where the person is detected. If each light unit is equipped with its own presence sensor, the presence signal may simply comprise an ID code of the light unit or of the presence sensor. In other cases, it has to be determined which light unit is the closest to the detected person.

The presence detector may comprise a counter that starts after presence detection and is initialized after a predetermined time interval without anew detection of presence. Only, if a person is detected, while the counter is in an initialized state, a presence signal is sent. Thus, the control unit is not flooded with unnecessary information.

FIG. 1 shows exemplary embodiments of the light guidance system according to the present invention. All components and subunits shown in FIG. 1 may be directly or indirectly connected to the external power supply system 200 (not shown). Moreover, in all examples, there may be provided a plurality of presence sensors 102 and light units 103 or subunits. The dotted lines indicate that optionally a wireless connection can be used.

Figure 1A:
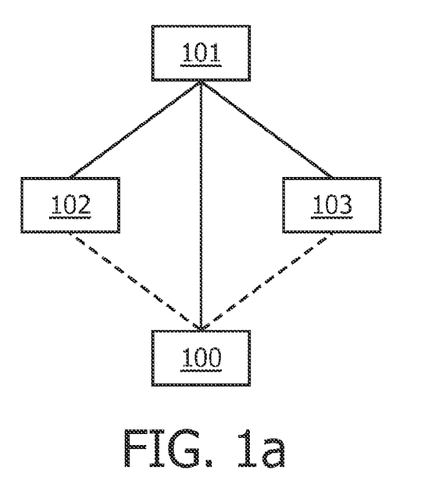
FIG. 1 shows different embodiments for connecting the components of the system

In FIG. 1a, the control unit 100, the presence sensor 102 and the light unit 103 are all connected to the auxiliary power supply system 101. The presence sensor 102 and the light unit 103 are also connected to the control unit 100. In this example, all constituents of the system are provided separately and independently.

Figure 1B:
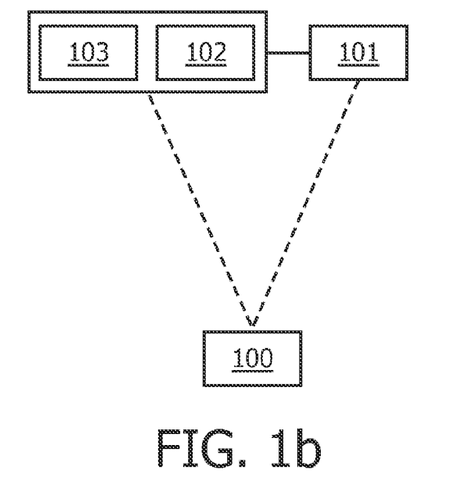

In FIG. 1b, the light unit 103 and the presence sensor 102 are comprised in one subunit connected to the auxiliary power supply system 101 and to the control unit 100. Thus, each light unit 103 is provided with a corresponding presence sensor 102. A presence signal can therefore be unambiguously localized by the identity code either of the presence sensor 102 or of the light unit 103.

Figure 1C:
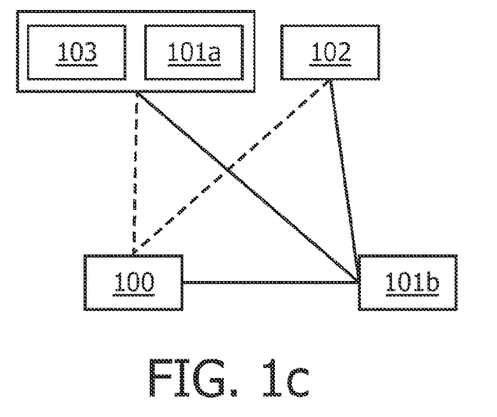

In FIG. 1c, each light unit 103 is provided with a separate and independent local auxiliary power supply system 101a. The subunit comprising the light unit 103 and the local auxiliary power supply system 101a is connected at least to the control unit 100 and may be additionally connected to a central auxiliary power supply system 101b. The central auxiliary power supply system 101b supplies power to the presence sensor 102 and to the control unit 100. In this example, the presence sensor 102 or a presence sensor array is provided separately from the light unit 103. Hence, a presence sensor 102 may correspond to several light units 103 so that fewer presence sensors 102 can be used and material and costs can be saved. In case of using wireless communication between the control unit 100 and the subunit comprising the light unit 103 and the local auxiliary power supply 101a, the subunit remains functional, even if the wired connections in the surroundings are broken.

Figure 1D:
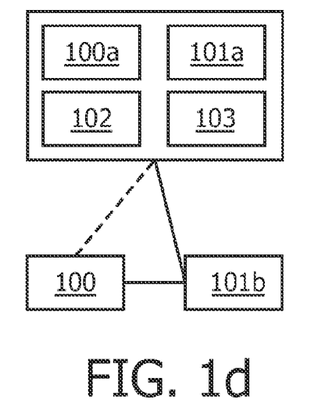

In FIG. 1d, another exemplary embodiment is shown, wherein the presence sensor 102, the light unit 103, the local auxiliary power supply system 101a and a local control unit 100a are comprised in one subunit. This subunit is connected either wired or wirelessly to the control unit 100 and optionally to the central auxiliary power supply system 101b. This allows on the one hand a central coordination and controlling of several subunits (only one is shown), while on the other hand the single subunits are independently functional. Therefore, in this embodiment, the whole system is more stable.

The control unit 100 determines whether power is supplied by the external power supply. If it is determined that no power is available from the external power supply system, the control unit 100 determines a power value relating to the charge status or voltage status of the auxiliary power supply system 101. If the auxiliary power supply system 101 is fully charged, the power value is high. If the external power supply is not available, the control unit 100 adjusts the level of light emitted by the light unit 103 depending on the determined power value and on the received presence signals. If no one is detected nearby the light unit 103 and thus no illumination is required, the light unit 103 may either be in an off-state or emitting at a low intensity level. If the power value is high and thus sufficient power is available from the auxiliary power supply system 101, the control unit 100 increases the illumination level of a light unit 103, where a person is detected nearby, for a predetermined period. However, if a person is detected and the power value is low, the control unit 100 adjusts the light level of the light unit 103 close to the detected person so that there remains enough energy for providing a preset minimum light level for a preset minimum period. Alternatively, the control unit 100 may reduce the time period of maintaining the high light level in order to ensure the illumination at the minimum level for the remaining time of the minimum period. Thus, if the power value is low, the light unit 103 may be controlled to emit at high level, but only for a short time. If the power value is high, the high level may be maintained for a longer period. The predetermined time period for maintaining the increased light level can be set as the time necessary to pass from one light unit 103 to the next, so that always at least one light unit 103 in the direct surroundings of the person is emitting at high level. In order to make a passerby feeling more at ease, the period for maintaining the high level may be set so that the illumination periods of one and the next light unit 103 overlap. Possibly, the light level of a light unit 103 is not continuously maintained, but the light unit 103 may be controlled to switch between a high and low level or between on- and off-states. By this, power is saved and a longer illumination period and/or a higher light level can be provided. Many variations of these scenarios are possible. The predetermined minimum level and period of illumination can be set according to the requirements. This allows adapting the illumination to the given conditions and scheduling the energy supplied by the auxiliary power supply system 101 in order to provide a required minimum illumination despite of a low power value.

If the light guidance system comprises more than one light unit 103, the control unit 100 may determine a priority value of the light units 103 based on whether a person is detected nearby in case of a restricted availability of power. The light units 103, where a person is detected, have a higher priority than those with no person present nearby and are controlled to emit light at a higher intensity level.

All components of the system may be communicating in a wired or wireless fashion, using a bus system, power line European Installation Bus (EIB), Local Operating Network (LON), Local Control Network (LCN), Site Control Local Area Network (SCLAN), ethernet, etc. The presence signals are transmitted to the control unit 100. The control unit 100 may be embodied by a computer with a screen located in a central place of the premises, so that the presence of persons in the premises can be displayed, e.g. on a layout or as a list. Alternatively, a large display panel with LEDs to indicate where people are present in the premises may be used. The overview of the presence and movement of persons in the premises provided by the central control unit 100 is possibly updated in real-time. In case of an emergency, this facilitates the finding and rescuing of people, since the rescue service can easily follow the movement of people in the premises and help people in danger.

It is also possible to increase the light level of the next light unit 103 on a way or in a movement direction of a person together with a previous light unit 103, where the person is detected, in order to make a passerby feeling more at ease. For this, the control unit 100 has to determine, which light unit 103 will be the next to be the closest to the person. If the person is walking along a corridor, path or street, the control unit 100 may have the order of the light units 103 and their ID numbers stored in a memory. Thus, in an emergency situation, the control unit 100 sends a control signal to a light unit 103, which is next on the escape route with respect to another light unit 103 that has sent a presence signal, in order to increase already the light level of this next light unit 103, before the person has reached the next light unit 103. Possibly, also one or more of the following light untis 103 are already controlled to emit at high level to indicate a preferred escape route. Therefore, a person trying to exit the premises as fast as possible is guided by the illuminating light units 103 towards the exit.

Figure 2:
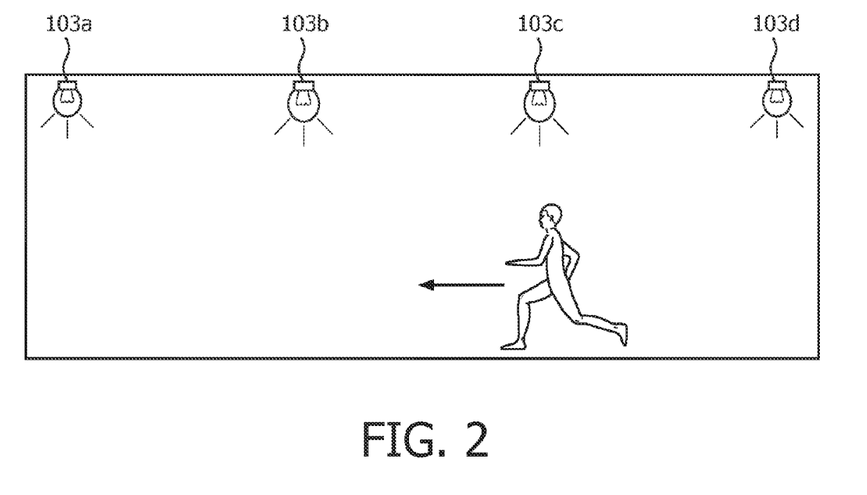
FIG. 2 shows an operation mode of the light guidance system in an emergency situation

FIG. 2 illustrates such an emergency situation, wherein the control unit 100 controls the light units 103 to emit at least at the mandatory level (see light units 103a and 103d). The person is fleeing along the corridor C in the direction of the flash. The closest light unit 103c is controlled to emit at high level. The control unit 100 then either detects the direction of movement or has information stored for determining which is the next light unit 103 on the escape route. The control unit 100 controls the next light unit 103b to emit also at high level. By these means, a person is guided towards the emergency exit in a fast and reliable way.

Figure 3:
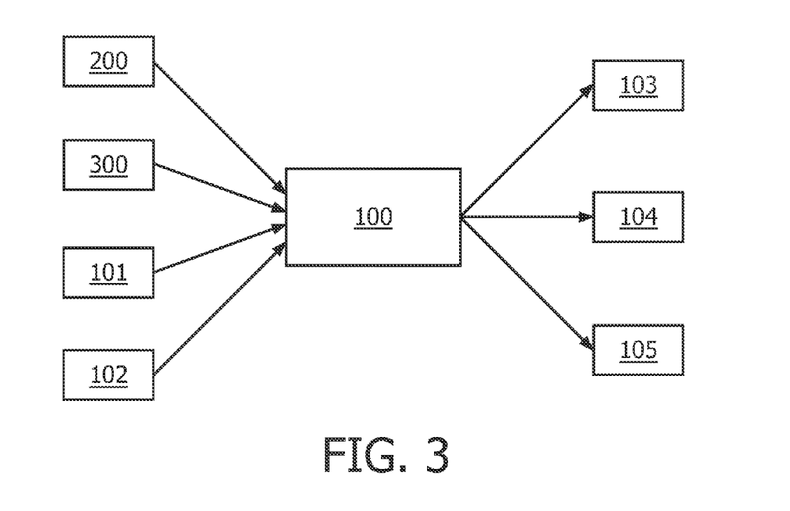
FIG. 3 shows an embodiment of a light guidance system used as a rescue aiding system according to the invention

The light guidance system according to the present invention can also be used as a rescue aiding system in hospitals, theaters, opera houses or the like. As described before, the rescue aiding system comprising a control unit 100 is communicating with or comprising one or more presence sensors 102, at least one light unit 103 and an auxiliary power supply system 101 and is connected to an external power system 200. Moreover, the rescue aiding system is possibly integrated in an alarm system 300 or at least communicating with an alarm system 300 in order to determine an alarm state, wherein the alarm system 300 may comprise smoke sensors or fire alarms. The rescue aiding system may normally be in a power saving stand-by mode. If there is an alarm or a power cut, the rescue aiding system is switched to an active state. However, it may also be favorable that the rescue aiding system is always in an active state.

In FIG. 3, a signal flow between components of a rescue aiding system according to an exemplary embodiment of the present invention is shown. The flashes indicate the direction of signal flow. However, it may be required to have a reversed or bidirectional signaling. The control unit 100 is normally powered by the external power supply system 200 and determines whether power is available from the external power supply system 200. The control unit 100 is further connected to an auxiliary power supply system 101, so that the control unit 100 is able to determine a power value relating to the power or charge status of the auxiliary power supply system 101. Possibly, the auxiliary power supply system 101 comprises itself a small control unit 100 for determining the power value and transmitting the power value as a signal to the control unit 100. The control unit 100 is moreover in communication with an alarm system 300 for determining an alarm state or for receiving an alarm signal. Furthermore, the control unit 100 receives presence signals from at least one presence sensor 102. Thus, the control unit 100 receives or determines information about the power supply of the external power supply system 200, about an alarm state, about the power or charge status of the auxiliary power supply system 101 and about the presence of a person. Based on this information, the control unit 100 controls the at least one light emitting light unit 103. Possibly, the rescue aiding system comprises also one or more presence indicators 104 and/or one or more local alerting units 105 which are also controlled by the control unit 100 based on the presence signals and on the determined power value.

The light units 103 of the rescue aiding system are preferably located in all rooms of a building and/or in regular intervals along an escape route. Each light unit 103 is able to emit light at least two intensity levels—at a mandatory level complying with legal norm standards and at a high level for better illumination of the surroundings.

Shown in table 1 is the operation of the rescue aiding system for different situations. If the control unit 100 determines an alarm state and/or a power cut with a high power value and if the control unit 100 has received a presence signal from the presence sensors 102, the light units 103 are controlled to emit light at a high level for a predetermined period. If the power level is low and a person present, the light level is adjusted to a mandatory level to comply with the security norms. If no person is detected, the light level is preferably adjusted to the mandatory level. It may however be preferred in some situations to adjust the light level to a high level, if the external power supply system 200 is working, even though no person is detected. By this, failure of a presence sensor is less drastic and a good illumination is provided for a fleeing person or rescue personnel. In all cases, the control unit 100 controls the illumination so that the mandatory light level can be provided at least for the remaining time of the mandatory period defined by the norms. If the norms require a mandatory minimum illumination in case of alarm or power cut, the light units 103 are controlled to emit light of at least this mandatory level.

TABLE 1

| Alarm | External power supply | Power value | Presence signal | Light level |
|---|---|---|---|---|
| √ | √ | — | √ | H |
| √ | √ | — | — | L (H) |
| √ | — | H | √ | H |
| √ | — | H | — | L |
| √ | — | L | √ | L |
| √ | — | L | — | L |
| — | — | H | √ | H |
| — | — | L | — | L |

If the light guidance system being employed as a rescue aiding system comprises further one or more presence indicators 104 indicating the presence of a person, these presence indicators 104 can be provided either locally and/or centrally. Local presence indicators 104 may be realized, for instance, as a lamp outside of a room in a corridor and operated, if a person is detected inside. If an alarm is triggered and the control unit 100 has received a presence signal indicating that a person is present in the room, the lamp outside of the room indicates the presence of the person for rescue people, e.g. by a certain color, by blinking or a certain brightness. It is also possible to use a light unit 103 located close to the room and being visible from the corridor. Furthermore, the presence indicator 104 may only be operated, if the presence is continuously detected. Such would be the case, if a person were lying unconscious in a room. An embodiment of a central presence indicator 104 can be a layout on a screen or board indicating the detected persons, as described before.

Furthermore, the rescue aiding system may comprise local alerting units 105 for alerting people in the immediate surroundings. The additional warning may be accomplished by a lamp or a warning hooter inside the room to alert the person acoustically and/or optically. The local alerting units 105 as well as the presence indicators 104 may only be operable in case of sufficient power.

Figure 4:
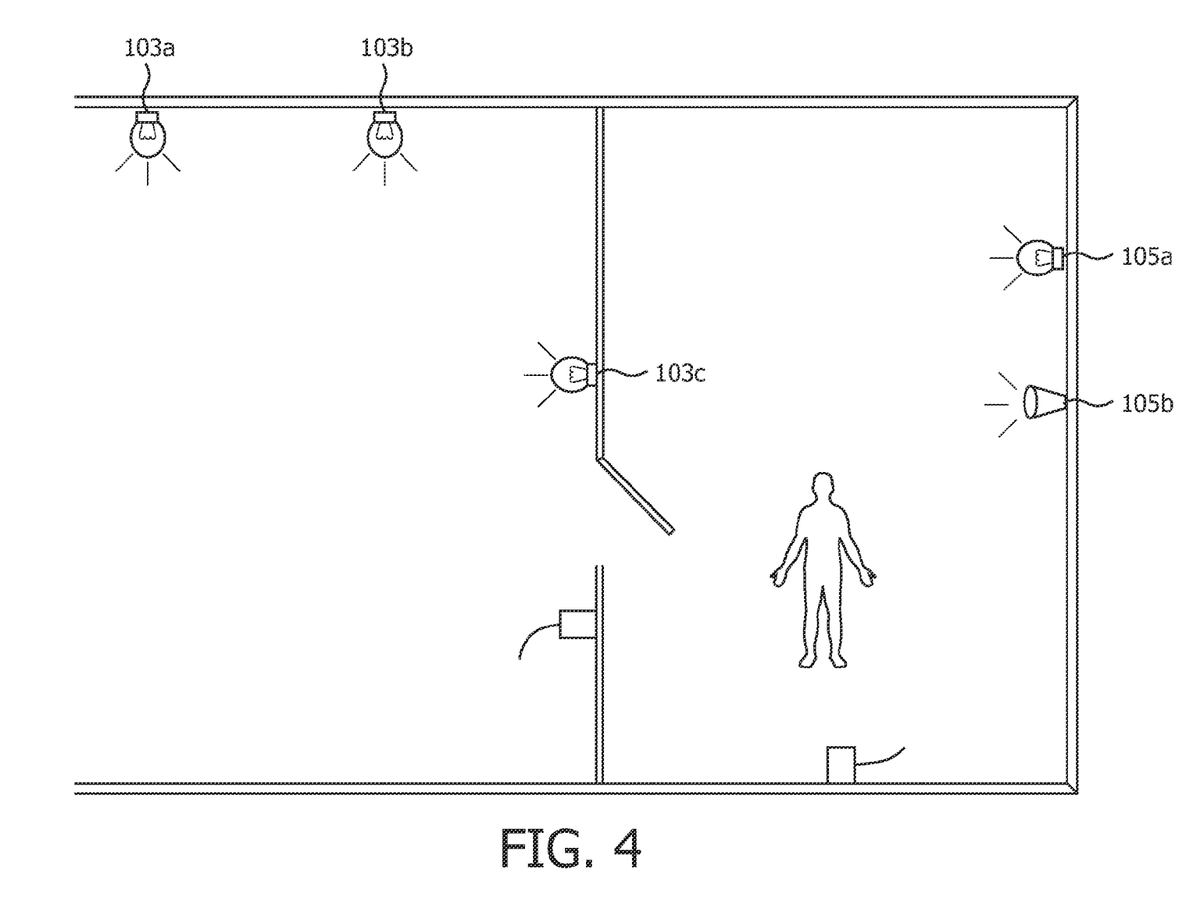
FIG. 4 shows another operation mode of the light guidance system in an emergency situation

In FIG. 4, an example of an emergency situation is shown. In an alarm state, all light units 103 are controlled to emit at the mandatory level, as shown in FIG. 4 for the light units 103a and 103b. In room A, the presence sensor 102 has detected a person and sends the presence signal to the control unit 100 (not shown). The control unit 100 switches then the local alerting unit 105 on. The local alerting unit 105 indicates the alarm state optically by blinking, color change or brightness of the optical alerting unit 105a and/or acoustically with an acoustical alerting unit 105b, e.g. a siren, honk or the like. Additionally, a presence indicator 104 outside of the room A may be operated to indicate the presence of the person inside. This locally provided presence indicator 104 may be realized as a lamp, for instance. In case that the determined power value is high, the control unit 100 controls the light unit 103c, which is the closest to the detected person, to emit light at a high level. It is possible to use one of the light units 103 simultaneously as a light unit 103 and either as an optical local alerting unit 105a or as a presence indicator 104, depending on their place of installation. The person inside the room A sees and/or hears the local alerting unit 105a/b and escapes from the room A. His nearest surroundings are illuminated by the closest light unit 103c. If the person is fallen unconscious or cannot escape from the room A, the rescue service can find the person more easily, since the presence indicator 104 indicates the person being inside the room A.

The control unit 100 may be located inside the premises or outside. An emergency call comprising the presence information of the rescue aiding system may be sent to an external rescue service, either if an alarm state is detected or only if it is determined that the control unit 100 cannot receive the presence signals.

Figure 5:
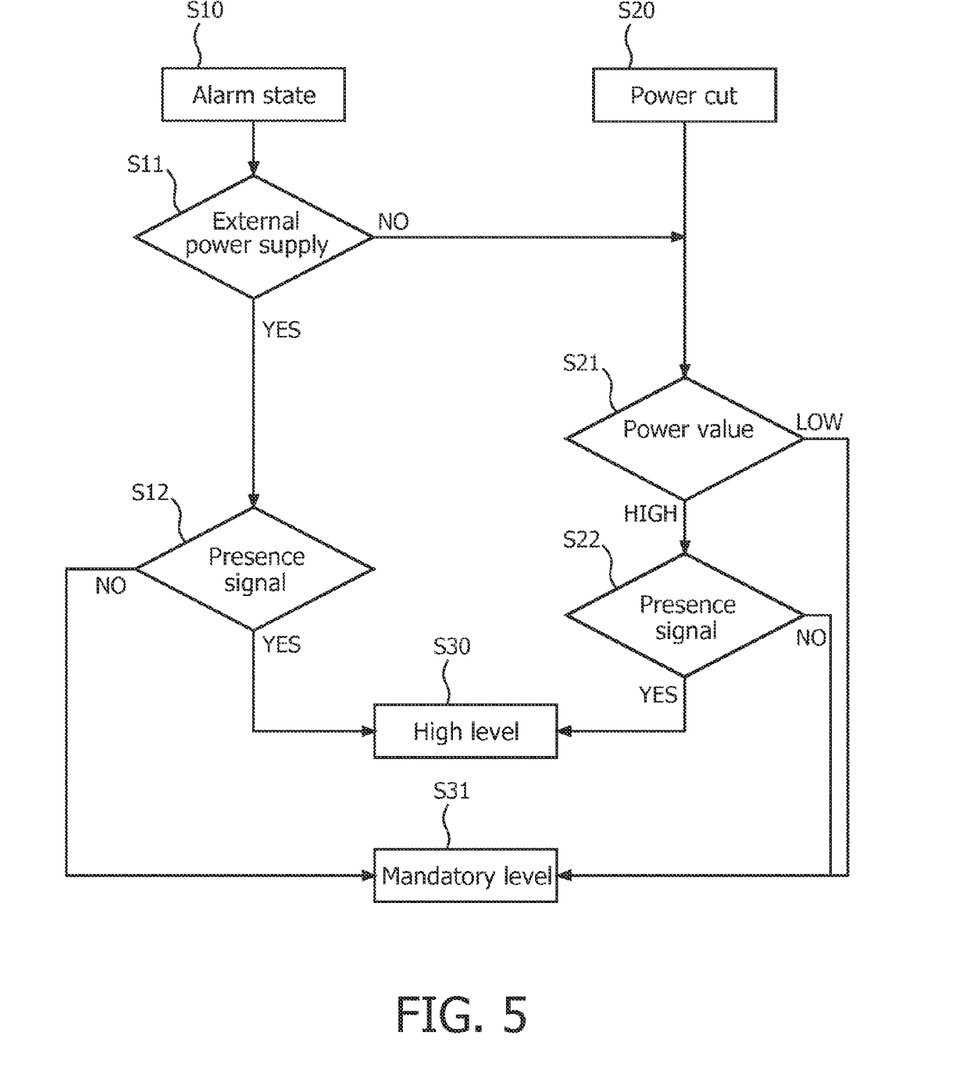
FIG. 5 shows a flow chart describing how the control unit of the light guidance system determine the light level of the light unit

As shown in table 1 and in FIG. 5, a method for controlling the rescue aiding system is described. In case of an alarm S10 and if the power supply by the external power supply system 200 is determined to be normal S11 and if no person is detected S12, the control unit 100 adjusts the light level emitted by the light unit 103 to a low mandatory level S31 as required by the norms. However, it may also be required in this situation to adjust the light level to a high level S30 (not shown). In case of an alarm signal S10 with normal power supply S11 and a presence signal indicating the presence of a person nearby S12, the control unit 100 adjusts the light unit 103 to emit at high level S30. In case of an alarm S10 with no external power supply S11 and/or in case of a power cut S20 and in case of a high power value S21 and a presence detected S22, the control unit 100 adjusts the light unit 103 to emit at the high level S30. In case of an alarm S10 with no external power supply S11 and/or in case of a power cut S20 and in case of a high power value S21 and no presence detected S22, the control unit 100 adjusts the light unit 103 to emit at the mandatory level S31. In case of an alarm S10 with no external power supply S11 and/or a power cut S20 and in case of a low power value S21 and a person being present nearby S22, the control unit 100 adjusts the light emitted by the light unit 103 to a low mandatory level S31.

Hence, a light unit 103 is only emitting at high level, if the conditions of an alarm S10 and/or power cut S20, of a high battery status S21 and of a detected presence S22 are on hand. The control unit 100 takes care that the higher light level is only maintained until the remaining energy of the auxiliary power supply 101 is just enough to provide for the remaining mandatory period the mandatory light level in order to meet the requirements of the norms. By this, it is ensured, that even in case of restricted power supply, the rescue aiding system remains functional.

A light guidance system, wherein the intensity of illumination and the duration of illumination is adaptive corresponding to the situation, results in a system, which is more reliable due to an economical use of power. Used in an emergency lighting system, the improved availability of illumination of high intensity helps to avoid panicking and allows a better orientation of a concerned person so that he can come faster to the right decision. By these means, the present invention provides a power saving adaptive emergency lighting system, which is on the one hand capable of helping people in danger to escape by means of adapted illumination and additional alarms and on the other hand of supporting rescue services by adapted illumination and by indicating the presence of a person in order to find people left in the premises faster.

The invention claimed is:

1. Light guidance system, comprising:
    an auxiliary power supply;
    at least one light unit adapted to emit light for illuminating surroundings; and
    a control unit configured to increase a light level of the light unit according to a presence signal indicating a presence of a person, wherein the control unit is further configured to reduce at least one of the increased light level or a duration of the increased light level in response to determining that a power supply capacity of the power supply falls below a power supply capacity value, wherein the reduction enables the power supply to provide a mandatory lighting period and a mandatory light level after the reduction.

2. Light guidance system according to claim 1, wherein the auxiliary power supply system comprises a battery or a self-contained power supply.

3. Light guidance system according to claim 2, wherein the control unit is configured to determine a charge status of the battery or a voltage status of a self-contained power supply.

4. Light guidance system according to claim 1, wherein the control unit is configured to increase the light level for a predetermined time period in case of a high-charged auxiliary power supply system and a presence signal.

5. Light guidance system according to claim 1, wherein the control unit is configured to adjust the light level and/or the mandatory lighting period.

6. Light guidance system according to claim 1, wherein in case of a low power value, the control unit is configured to adjust the light level of the light unit to the mandatory light level regardless of a presence signal.

7. Light guidance system according to claim 1, comprising at least two light units connected to the control unit, wherein the control unit is configured to determine a priority of the light units according to at least one presence signal indicating the presence of a person next to at least one of the light units and to adjust a light level of the light units according to their priority.

8. Light guidance system as in claim 1, comprising at least one presence sensor configured to detect the presence of a person and, in case of presence detection, to provide the presence signal to the control unit.

9. Light guidance system as claimed in claim 8, wherein the presence sensor is realized as an ultrasonic movement sensor and/or a radar-based movement sensor.

10. Light guidance system as in claim 1, used as a rescue aiding system, wherein the control unit is further configured to receive an alarm signal and/or to determine an alarm state.

11. Light guidance system as in claim 1, further comprising a presence indicator configured to indicate the presence and/or a direction of movement of a person locally and/or centrally.

12. Light guidance system as in claim 1, comprising a local alerting unit configured to indicate acoustically and/or optically an alarm state in a place, where a person is detected.

13. Light guidance system as in claim 1, wherein the control unit is configured to receive a plurality of presence signals of the light guidance system and to display the location of persons corresponding to the presence signals.

14. Light guidance system as in claim 1, wherein the control unit is configured to control the at least one light unit to emit light at high level, the at least one light unit being subsequent on the escape route to a light unit closest to a detected person.

15. Light guidance system as in claim 1, wherein said reduction is performed irrespective of said presence signal.

16. Method for controlling a light guidance system, comprising a light unit and a control unit, connected to an auxiliary power supply, the method comprising:
    determining whether a presence signal is received;
    determining whether a power supply capacity of the auxiliary power supply system falls below a power supply capacity value;
    adjusting a level of light emitted by the light unit according to the presence signal; and
    in response to determining that the power supply capacity falls below the power supply capacity value, reducing at least one of the adjusted light level or a duration of the adjusted light level such that the reducing enables the power supply to provide a mandatory lighting period and a mandatory light level of the light unit after the reducing.

17. Method as in claim 16, wherein said reducing is performed irrespective of said presence signal.

* * * * *